United States Patent Office 2,897,573
Patented Aug. 4, 1959

2,897,573

CERAMOPLASTIC AND METHOD OF MANUFACTURING SAME

Philip S. Hessinger, Little Falls, N.J., assignor to Mycalex Corporation of America, Clifton, N.J., a corporation of New York No Drawing. Application July 19, 1957
Serial No. 672,888

8 Claims. (Cl. 25—156)

This invention relates to vitreo-crystalline material and particularly to vitreo-micaceous material and a method of making same. More particularly, the present invention relates to ceramoplastics and a method for making same.

This application is a continuation-in-part of my now abandoned earlier U.S. patent application bearing Serial No. 606,192, filed August 27, 1956, and assigned to the assignee hereof.

Vitreo-micaceous materials normally fall into two classes, i.e. glass-bonded mica and the new ceramoplastic materials. A ceramoplastic is a material which in its finished form has ceramic-like properties but which is moldable like an organic plastic. The ceramoplastic with which this application is particularly concerned is synthetic fluor-phlogopite mica bonded by a vitreous phase. Other types of synthetic mica bonded by a vitreous phase fall within the scope of the present invention. Both types of materials have heretofore been made by molding under heat and pressure a powdered mixture of glass frit and micaceous material. When natural mica such as muscovite mica has been employed, the calcining or dehydration temperature of the natural mica has been a limiting factor in the manufacture and use of glass-bonded mica. Specifically, the glass employed had to have a sufficiently low softening temperature so that a mixture of said glass and mica could be rendered plastic for molding without the mica calcining which would render it disadvantageous for use as an electrical insulating material. Moreover, the material once molded could not be subjected to extreme operating temperatures since, under such conditions, the natural mica would tend to dehydrate or calcine. Accordingly, the natural mica acted as a limiting factor in both the manufacture and use of glass-bonded mica.

Recently, practical methods have been developed for manufacturing synthetic mica and particularly for manufacturing synthetic non-hydroxyl mica such as synthetic fluor-phlogopite mica which is substantially chemically pure and which has no water of constitution. Since the synthetic mica has no water of constitution, it does not calcine at relatively low temperatures and is therefore able to withstand much higher temperatures both during manufacture and during the use of the mica either alone or in a vitreo-micaceous material. Synthetic micas have heretofore been made into vitreo-micaceous materials generally known as ceramoplastics. However, the glass binders in the materials heretofore employed have been the low temperature glasses used to make glass-bonded mica which glasses, due to their relatively low softening temperature, act as a limiting thermal factor in the use of the ceramoplastic material and prevent the employment of the ceramoplastics at the higher operating temperatures at which the synthetic non-hydroxyl micas can operate.

As has been stated hereinbefore, both the ceramoplastics and glass-bonded mica are made by subjecting a mixture of powdered frit and micaceous material to heat and pressure as in a mold. The need for a frit has always caused substantial production problems as the composition of the frit cannot be closely controlled due to the relatively high activity of the frit components which causes a reaction with the crucible walls during the melting process in the manufacture of the frits. This reaction tends to cause the frit components to introduce chemicals forming part of the refractory walls of the crucible and these chemicals can on occasion cause rather radical departures from the normal expected properties of a desired frit. Such a quality control problem causes a substantial amount of frit to be rejected thus raising the price of the frit.

Moreover, the frits most often used in the manufacture of vitreo-micaceous materials are lead borates which are relatively heavy. This weight is, of course, imparted to the vitreo-micaceous material to be somewhat heavy for certain applications where weight is a consideration.

Another disadvantage of using frit to manufacture vitreo-micaceous material is that the softening point of the frit is relatively well defined, the frit becoming unduly fluid if over-heated and unduly viscous if not heated enough. Accordingly, in preheating the vitreo-micaceous powdered mixture prior to molding it, it becomes necessary to closely control the preheat temperature which requires the constant attention of a worker or relatively expensive temperature control equipment.

In view of all these considerations, I have devised a new ceramoplastic which is made without the use of a frit and whose formulation eliminates or reduces the disadvantages of frit formulated ceramoplastics discussed hereinbefore.

It is therefore one object of the present invention to provide a new vitreo-crystalline material which is made without the use of a frit.

Another object of the present invention is the provision of a new ceramoplastic material which is made without the use of a frit.

A further object of the present invention is the provision of a new and improved method of manufacturing vitreo-crystalline materials.

Still another object of the present invention is the provision of a new and improved formulation for vitreo-crystalline materials of the ceramoplastic type.

Yet a further object of the present invention is the provision of a new light-weight ceramoplastic material.

Still a further object of the present invention is the provision of a new method for manufacturing vitreo-crystalline materials of the ceramoplastic type wherein the preheat temperatures of said material prior to molding thereof falls within a relatively broad range thereby obviating the necessity for close temperature control.

Another object of the present invention is the provision of a new formulation having ceramoplastic materials which is readily moldable with a minimum of mold release agent.

The above and other objects, characteristics and features of the present invention will be more fully understood from the following description.

The vitreo-micaceous materials heretofore known employed glass frits which are made of lead borates or modified lead borates. These glasses were designed to be relatively fluid above 900° F. whereby to permit the molding of vitreo-micaceous materials and particularly of glass-bonded mica without the mica therein calcining. As stated hereinbefore, these lead borates or modified lead borates are in the form of frits. In order to take advantage of the superior thermal properties of synthetic mica and particularly of synthetic fluor-phlogopite mica, it is desirable that the binder in a ceramoplastic material have a softening or melting temperature approximately 200° F. to 300° F. greater than that of the lead borate frits employed heretofore.

In accordance with the present invention, I intend to substitute for the frit heretofore used a crystalline chemical or chemicals having ions which act as glass formers and other ions which act as glass modifiers and still other ions which will react to form a crystalline material different from the original crystalline material or materials used in lieu of the frits. Broadly, I plan to powder said crystalline material so that it can pass through a 200 mesh screen and to mechanically mix said powdered crystalline material with powdered micaceous material, preferably powdered synthetic fluorphlogopite mica, which can pass through a 100 mesh screen. During the mixing of these two powdered materials I add a temporary binder such as water in a quantity up to about 10% by weight. After these elements have been thoroughly mixed to cause a uniform dispersal of them, a quantity thereof is pressed at room temperature to a pressure of about 2 tons per square inch whereby to form a preform which can be readily handled either by a worker's hands or by tongs or by automatic equipment. The preform is thereafter preheated to cause the non-micaceous material to react to form a liquid. Of course, this liquid is preferably quite viscous whereby to permit the preform to substantially maintain its cold pressed form. After the preform has been preheated, it is introduced into a mold and the mold is brought home to subject the preheated preform to suitable pressure. Thereafter, the compressed preform is permitted to cool and upon cooling the ions in the viscous liquid react to form a glass and to form another disperse phase of crystals, the crystals fitting in between the micaceous crystals and the glass acting to bind both the micaceous crystals and the other part of the crystalline phase together.

I presently contemplate using at least two powdered crystalline materials in lieu of the frit as I have found that by using two selected crystalline materials the proper ions can be provided to obtain the reaction hereinbefore described. However, it is conceivable that a complex single crystalline material could function in the manner described.

In one form of the present invention, it is planned to use potassium silico fluoride ($K_2SiF_6$) and alumina ($Al_2O_3$) as the crystalline substitute for frit. The mixture of these two chemicals either reacted or unreacted will hereinafter be called the binder. I have found that a satisfactory reaction is obtained if a binder made up of 40% to 60% of the potassium silico fluoride and 60% to 40% alumina is used. When using a binder composition of the type described immediately above, it has been found that a satisfactory ceramoplastic may be obtained if a mixture of 30% to 85% synthetic mica and 70% to 15% binder is made to form the preform. Accordingly, the range of composition of a powdered preform satisfactory to yield a ceramoplastic according to the present invention may be as follows:

| | Percent |
|---|---|
| Synthetic fluor-phlogopite mica | 30 to 85 |
| $K_2SiF_6$ | 6 to 42 |
| $Al_2O_3$ | 6 to 42 |

To this mixture is added a temporary binder such as water up to about 10% of the weight of the solid mixture, and after the water and the mixture are homogenized, a portion thereof is compressed under about 2 tons per square inch pressure to form a preform. The preform is thereafter preheated for at least one-half hour to between 1500° F. and 1800° F. to cause the potassium silico fluoride and the alumina to react and form a viscous liquid. Thereafter, the preheated preform is placed in a mold, either a compression mold or the mold of an injection molding machine and the mold is operated to subject the preheated preform to a pressure somewhere between 4,000 pounds per square inch and 50,000 pounds per square inch although higher and lower pressures may be used if the proper equipment is available. The pressure is held for a short time and thereafter the molded preform is released and permitted to cool. Upon cooling, the ions in the liquid formed upon heating react to yield the plate-like crystals of potassium aluminum fluoride which disperse themselves evenly throughout the material and which fit in between the plate-like crystals of synthetic fluor-phlogopite mica. Also formed upon cooling is a glass which may be a potassium aluminum silica glass or a potassium aluminum silica fluoride glass or both, depending upon the composition of the binder. In any event, the glass formed serves as a binder for the two parts of the crystalline phase of the ceramoplastic. Of importance during the heating and cooling of the preform is the yielding of silicon tetrafluoride gas which serves as a fugitive mineralizer to facilitate the reactions described above and to improve the bond between the crystalline phase and the vitreous phase of the ceramoplastic. This formation of silicon tetrafluoride obviates the necessity of adding a mineralizer as is often desirable when using a frit.

As suggested above, there are two general methods of manufacturing ceramoplastics in accordance with the present invention. One of these methods is a compression molding method which is used to make sheet material and other simple shaped articles out of the material. For intricate shapes, injection molding may be employed. Since there are variations in each of these methods, each shall be discussed separately hereinafter.

*Compression molding*

In compression molding, I have found that the binder and the synthetic mica may be mixed in the following range of proportions:

| | Percent |
|---|---|
| Binder | 15 to 70 |
| Mica | 30 to 85 |

Accordingly, the ranges of proportions to make ceramoplastic when using potassium silico fluoride and alumina may be as follows:

| | Percent |
|---|---|
| Synthetic fluor-phlogopite mica | 30 to 85 |
| $K_2SiF_6$ | 6 to 42 |
| $Al_2O_3$ | 6 to 42 |

One example of a highly desirable composition to yield an excellent compression molded ceramoplastic is as follows:

| | Percent |
|---|---|
| Synthetic fluor-phlogopite mica | 50 |
| $K_2SiF_6$ | 25 |
| $Al_2O_3$ | 25 |

Ceramoplastics formed from the above mentioned materials within the ranges set forth above have been found to give highly satisfactory electrical, mechanical and thermal properties, fully comparable to those attributed to the vitreo-micaceous materials and having an operating temperature 200° F. to 300° F. greater than that heretofore achieved. Moreover, and as has been described hereinbefore, these materials greatly simplify the manufacture of ceramoplastics and are lighter in weight and cheaper.

In compression molding, any of the compositions falling within the ranges set forth above or falling within the specific range set forth may be made as follows. All three solid materials are finely ground as was described in detail heretofore. Thereafter, the finely ground powders are mechanically mixed and during the mixing thereof water or any other suitable temporary binder is added up to 10% of weight of the solid material. The water acts to hold the mixture together upon cold pressing. Subsequent to the obtaining of a uniform mixture, the mixture is introduced into a suitable mold and is cold pressed into a preform held together by the water or other temporary binder. Thereafter, the pressed preform is permitted to dry for a period of time depending on the size and shape thereof. After drying, the preform is pre-heated in a suitable oven to a temperature ranging from 1500° F. to 1800° F. in order to cause the potassium silico fluoride and alumina to react and form a liquid which is highly viscous. After the entire preform has achieved the preheated temperature (preheating time of not less than about one-half hour), it is placed in a compression mold which has been preheated to a temperature between 500° F. and 700° F. and the mold is operated to subject the preheated preform to a pressure of about 2 tons per square inch. After hot pressing, the material is cooled, either at room temperature or in an annealing furnace which gradually reduces the temperature of the compression molded product to room temperature. During the cooling the ions in the liquid formed from the reaction of the potassium silico fluoride and alumina react to form plate-like crystals of potassium alumina fluoride which are dispersed throughout the compression molded product and which fit between the plate-like crystals of synthetic fluor-phlogopite mica. Moreover, the glass forming and glass modifying ions contained in the $K_2SiF_6$ and $Al_2O_3$ combine to form a glass which is either a potassium aluminum silica glass or a potassium aluminum silica fluoride glass or perhaps both. The glass acts as a binder and in all respects is a substitute for the fritted lead borates and fritted modified lead borates heretofore known. However, the glass has been produced without the need of a fritting operation which is extremely costly, and the glass is able to withstand temperatures from 200° F. to 300° F. greater than the fritted lead borates heretofore used. After the compression molded product has been brought to room temperature, the surface thereof may be ground or otherwise treated. However, it should be pointed out that ceramoplastics made in accordance with the present invention yield extremely smooth surfaces and a grinding operation is not ordinarily necessary. Since the surface grinding of compression molded ceramoplastics has heretofore been a relatively costly operation, the elimination thereof in my present method is a highly desirable feature of this invention.

When using the preferred composition for compression molding, I have found that it is preferable to preheat the preform to 1700° F. and to preheat the compression mold to 600° F. However, temperatures falling within the ranges presented above will yield satisfactory products.

*Injection molding*

As stated hereinbefore, ceramoplastics embodying the present invention may be injection molded. A satisfactory injection molded ceramoplastic may be made within the following ranges:

| | Percent |
|---|---|
| Synthetic fluor-phlogopite mica | 30 to 85 |
| Binder | 15 to 70 |

When using potassium silico fluoride and alumina, the batch composition may fall within the following ranges:

| | Percent |
|---|---|
| Synthetic fluor-phlogopite mica | 30 to 85 |
| $K_2SiF_6$ | 6 to 42 |
| $Al_2O_3$ | 6 to 42 |

An example of a composition which yields an excellent ceramoplastic embodying the present invention is as follows:

| | Percent |
|---|---|
| Synthetic fluor-phlogopite mica | 50 |
| $K_2SiF_6$ | 25 |
| $Al_2O_3$ | 25 |

Each of the elements making up the batch composition is preferably ground to a powder as described hereinbefore. The powders are mechanically mixed and a temporary binder such as water is added to the mixture up to 10% of the weight of the solids therein to facilitate the formation of a preform by cold pressing. The moist mixed powders are cold pressed into pellets or pills at a pressure of approximately 2 tons per square inch. The pellets or pills are thereafter preheated for at least about one-half hour to a temperature within the range of 1500° F. to 1800° F. whereby to cause the $K_2SiF_6$ and $Al_2O_3$ to react and form a viscous liquid. The preheated pellet or pill is thereafter transferred to a mold cavity of an injection molding machine. The mold defining the mold cavity has been preheated to a temperature between 500° F. and 700° F., and has very little mold release agent therein. Thereafter, the mold ram is brought home so as to subject the preheated pellet to a pressure ranging from 10,000 to 50,000 pounds per square inch, the pressure depending upon the intricacy of the shape to be molded and upon the desired mechanical properties. Prior to driving home the mold ram, metallic inserts may be introduced into the mold and when the molding operation has been completed these inserts will be permanently united with the ceramoplastics being formed. Ceramoplastics made from compositions described hereinbefore have coefficients of expansion of about $12 \times 10^{-6°}$ C. This coefficient of expansion closely matches that of many metals such as, for instance, a number of stainless steels. With the close matching of coefficients of thermal expansion, metal inserts may be permanently molded into the ceramoplastic to insure a permanent uniting between the inserts and the ceramoplastic made in accordance with the present invention.

After a very short time the mold ram is released and the molded product is ejected from the mold cavity. While in the mold and after ejection therefrom, the molded product cools and during the cooling plate-like crystals of potassium aluminum fluoride are formed from ions in the liquid resulting from the heating of $K_2SiF_6$ and $Al_2O_3$. These crystals are dispersed throughout the molded product and interleave with the mica crystals. Moreover, a glass is formed during the cooling and this glass acts as a binder for the synthetic fluor-phlogopite mica crystals and the plate-like crystals of potassium aluminum fluoride. The glass, as has been stated hereinbefore, is a potassium aluminum silica glass or a potassium aluminum silica fluoride glass or both.

When using the preferred composition stated hereinbefore, I have found that it is preferable to preheat the pellet or pill to 1600° F. and to preheat the mold in the injection molding apparatus to 600° F. However, temperatures falling within the ranges presented above will yield a satisfactory product.

Other raw materials which combine to form an excellent binder with an interspersed secondary crystalline phase have been discovered. For instance, in lieu of the potassium silico fluoride described above, sodium silico fluoride or lithium silico fluoride can be employed. Raw materials falling within the following ranges may be used in either compression molding or injection molding:

| | Percent |
|---|---|
| Synthetic fluor-phlogopite mica | 30 to 85 |
| $Na_2SiF_6$ | 6 to 42 |
| $Al_2O_3$ | 6 to 42 |

A preferred composition utilizing sodium silico fluoride is as follows:

| | Percent |
|---|---|
| Synthetic fluor-phlogopite mica | 50 |
| $Na_2SiF_6$ | 25 |
| $Al_2O_3$ | 25 |

The compositions presented above including sodium silico fluoride are suitable for both injection molding and compression molding and the steps in both processes together with preheat temperatures and other conditions are identical with those disclosed for injection and compression molding when potassium silico fluoride is present in the binder. When using sodium silico fluoride and alumina as the binder raw materials, the vitreous phase of the final product is a sodium aluminum silica glass or a sodium aluminum silica fluoride glass. The secondary plate-like crystalline phase which is dispersed throughout the material and interleaved with the mica in the ceramoplastic is sodium aluminum fluoride ($NaAlF_4$).

Still another composition which yields an excellent ceramoplastic and which comes within the scope of the present invention is one falling within the following ranges of materials:

| | Percent |
|---|---|
| Synthetic fluor-phlogopite mica | 30 to 85 |
| $Li_2SiF_6$ | 6 to 42 |
| $Al_2O_3$ | 6 to 42 |

A preferred composition which includes as a binder raw material lithium silico fluoride is presented below:

| | Percent |
|---|---|
| Synthetic fluor-phlogopite mica | 50 |
| $Li_2SiF_6$ | 25 |
| $Al_2O_3$ | 25 |

Materials including lithium silico fluoride and falling within the ranges or specific compositions described above are satisfactory for use both in injection and compression molding. When used in injection or compression molding, the steps of the processes and the conditions employed in said processes are the same as has been described above with regard to the injection and compression molding of materials utilizing potassium silico fluoride and alumina as the binder raw materials. When lithium silico fluoride and alumina are used as the binder raw materials, the vitreous phase of the resulting ceramoplastic is a lithium aluminum silica glass or a lithium aluminum silica fluoride glass or both. The plate-like secondary crystalline phase is lithium aluminum fluoride ($LiAlF_4$).

It has been found that although materials falling within the ranges described above or embodying the specific compositions presented hereinbefore yield a ceramoplastic material superior in ultimate properties and ease of manufacture to any ceramoplastic materials heretofore known, an improved product can be obtained if the binder composition contains alumina and a combination of alkali silico fluorides. It appears that a more stable vitreous phase is yielded by the presence of different alkali ions. For instance, an excellent ceramoplastic, either compression or injection molded, will result when raw materials falling within the following ranges are used:

| | Percent |
|---|---|
| Synthetic fluor-phlogopite mica | 30 to 85 |
| $Al_2O_3$ | 6 to 42 |
| $K_2SiF_6$ | 6 to 42 |
| $Na_2SiF_6$ | 0 to 20 |

It has further been found that if the ratio of the $K_2SiF_6$ to the $Na_2SiF_6$ is approximately 4:1 and the materials fall within the above described ranges, then the product will have yet superior qualities. An excellent ceramoplastic is yielded from raw materials of the following proportions:

| | Percent |
|---|---|
| Synthetic fluor-phlogopite mica | 50 |
| $Al_2O_3$ | 25 |
| $K_2SiF_6$ | 20 |
| $Na_2SiF_6$ | 5 |

Materials of this type will have a vitreous phase in the form of potassium sodium aluminum silica glass or potassium sodium aluminum silica fluoride glass or both. The secondary crystalline phase will be potassium sodium aluminum fluoride which is best expressed by the formula $(K,Na)AlF_4$. Crystals of this type are plate-like and will be interspersed between the plate-like synthetic fluor-phlogopite mica crystals. The steps and condition for either compression or injection molding the above mentioned material are the same as those described for a ceramoplastic having only $Al_2O_3$ and $K_2SiF_6$ for binder raw materials.

Another composition which yields an extremely satisfactory ceramoplastic material is one wherein both potassium silico fluoride and lithium silico fluoride are both used in the binder together with alumina. Again the raw materials for ceramoplastic having alumina potassium silico fluoride and lithium silico fluoride as the binder raw materials should have the materials appear within the following ranges:

| | Percent |
|---|---|
| Synthetic fluor-phlogopite mica | 30 to 85 |
| $Al_2O_3$ | 6 to 42 |
| $K_2SiF_6$ | 6 to 42 |
| $Li_2SiF_6$ | 0 to 20 |

Preferably, the ratio of potassium silico fluoride to lithium silico fluoride should be about 4:1.

A preferred composition for ceramoplastic having both potassium silico fluoride and lithium silico fluoride is presented below:

| | Percent |
|---|---|
| Synthetic fluor-phlogopite mica | 50 |
| $Al_2O_3$ | 25 |
| $K_2SiF_6$ | 20 |
| $Li_2SiF_6$ | 5 |

Still another series of raw materials which will yield a superior ceramoplastic material are those wherein the binder includes alumina, sodium silico fluoride and lithium silico fluoride. Preferably, the ratio of sodium silico fluoride to lithium silico fluoride should be 1:1 although this is not necessary. The materials making up the raw batch for the ceramoplastic should fall within the following ranges by weight:

| | Percent |
|---|---|
| Synthetic fluor-phlogopite mica | 30 to 85 |
| $Al_2O_3$ | 6 to 42 |
| $Na_2SiF_6$ | 3 to 42 |
| $Li_2SiF_6$ | 3 to 42 |

A preferred composition is as follows:

| | Percent |
|---|---|
| Synthetic fluor-phlogopite mica | 50 |
| $Al_2O_3$ | 25 |
| $Na_2SiF_6$ | 12.5 |
| $Li_2SiF_6$ | 12.5 |

The materials described above can be either injection molded or compression molded by the same methods and under the same conditions as have been described above in detail. The vitreous phase of the resulting ceramoplastic will consist of a sodium lithium aluminum silica glass or a sodium lithium aluminum silica fluoride glass or both. The plate-like secondary crystals will be sodium lithium aluminum fluoride which may best be expressed by the formula $(Na,Li)AlF_4$.

While each of the above materials will yield a superior ceramoplastic, it has been discovered that if all three above mentioned alkali silico fluorides are present, a yet better material will result. Broadly, ceramoplastics comprising mica, alumina and the three alkali silico fluorides are made of raw materials falling within the following ranges by weight:

| | Percent |
|---|---|
| Synthetic fluor-phlogopite mica | 30 to 85 |
| $Al_2O_3$ | 6 to 42 |
| $K_2SiF_6$ | 6 to 42 |
| $Na_2SiF_6$ | 0 to 20 |
| $Li_2SiF_6$ | 0 to 20 |

Preferably, the ratio of potassium silico fluoride to the sum of the sodium silico fluoride and the lithium silico fluoride is between 3:1 and 4:1. An excellent ceramoplastic results when the following composition is employed:

| | Percent |
|---|---|
| Synthetic fluor-phlogopite mica | 50 |
| $Al_2O_3$ | 25 |
| $K_2SiF_6$ | 19 |
| $Na_2SiF_6$ | 3 |
| $Li_2SiF_6$ | 3 |

The above materials may be either injection molded or compression molded in precisely the same manner and under precisely the same conditions as has been described hereinbefore. The resulting vitreous phase for the ceramoplastic will be a potassium sodium lithium aluminum silica glass or a potassium sodium lithium aluminum silica fluoride glass or both. The secondary plate-like crystalline phase will be potassium sodium lithium aluminum fluoride crystals which may best be expressed by the formula $(K,Na,Li)AlF_4$.

It has also been discovered that the other alkali metals, rubidium and cesium, will also act as satisfactory raw materials as substitutes for or in addition to the alkali silico fluorides hereinbefore mentioned. However, in view of the costliness of these materials and the difficulty encountered in handling them, it is strongly doubted that they have any commercial significance. However, if used, they appear in the proportions hereinbefore set forth for sodium silico fluoride and lithium silico fluoride.

From the foregoing description, it will be seen that I have developed new ceramoplastic materials which have higher thermal resistance than those heretofore known in order to take advantage of the superior thermal properties of synthetic fluor-phlogopite mica and other non-hydroxyl micas. These non-hydroxyl micas normally withstand greater temperatures than natural muscovite mica heretofore used in making vitreo-micaceous materials since there is no hydroxyl ion present to be driven off at low temperatures. Moreover, the new ceramoplastics developed by me are made by a much more inexpensive and simple process than was heretofore employed. Particularly in my new method, the need for providing a glass frit is eliminated. Moreover, the binder chemicals, being of high purity, yield a ceramoplastic whose composition may be closely controlled and wherein impurities are substantially eliminated, these impurities having heretofore produced some variation in the quality of the final product. Moreover, ceramoplastics made in accordance with the present invention have a low specific gravity, approximately 2.7 as contrasted with a specific gravity of about 3.8 for ceramoplastics made with lead borate frits heretofore used, require less mold lubricant and have a much wider preheat temperature range. All of these attributes either simplify manufacture or yield a superior final product.

While I have disclosed new ceramoplastics in which the binder is derived from alkali silico fluorides and alumina, preliminary studies indicate that other chemicals will produce similar superior products. For instance, other binder compositions may be made up from alkali aluminum fluoride and silica, magnesium fluoride and alkali aluminum silicate and numerous others. All of these compositions can be used as binders to yield ceramoplastics without the need of making a fritted glass.

While I have herein shown and described several forms of the present invention and have suggested others, it will be understood that various changes and modifications may be made therein within the scope of the appended claims without departing from the spirit and scope of this invention.

Having now described my invention, what I claim as new and desire to secure by Letters Patent, is:

1. A method of making hot pressed material of the vitreo-crystalline type wherein synthetic fluor-phlogopite crystals form a part of the crystalline phase, and the vitreous phase of said material and another part of the crystalline phase thereof are both formed by the reaction of potassium silico fluoride and alumina, comprising the steps of mixing from 6% to 42% potassium silico fluoride, 6% to 42% alumina and 30% to 85% synthetic fluorphlogopite mica, heating said mixture to a temperature between 1500° F. and 1800° F. to cause the potassium silico fluoride and the alumina react to form a liquid, compressing said heated mixture, and cooling said mixture whereby to cause said liquid to form a multiplicity of dispersed crystals forming the other part of the crystalline phase of said hot pressed material and a glass acting as a binder for said crystalline phase.

2. The method of making a hot pressed ceramoplastic material, comprising the steps of mixing approximately 25% potassium silico fluoride, approximately 25% alumina and approximately 50% synthetic fluorphlogopite mica together with a small amount of a temporary binder, compressing said mixture to form a preform, heating said preform to a temperature between 1500° F. and 1800° F. to cause the potassium silico fluoride and alumina to react to form a liquid, compressing said heated preform in a mold preheated to between 500° F. and 700° F., and cooling said compressed preform whereby to cause said liquid to form a multiplicity of dispersed crystals forming the other part of the crystalline phase of said hot pressed material and a glass acting as a binder for said crystalline phase.

3. A method of making hot pressed material of the vitreo-crystalline type wherein micaceous crystals form a part of the crystalline phase, and the vitreous phase of said material and another part of the crystalline phase thereof are both formed by the reaction of alkali silico fluoride and alumina, comprising the steps of mixing alkali silico fluoride, alumina and micaceous material, heating said mixture to a temperature which causes the alkali silico fluoride and the alumina to react to form a liquid, compressing said heated mixture, and cooling said mixture whereby to cause said liquid to form a multiplicity of dispersed crystals forming the other part of the crystalline material and a glass acting as a binder for said crystalline phase.

4. A method of making hot pressed material of the vitreo-crystalline type wherein synthetic fluor-phlogopite mica crystals form a part of the crystalline phase, and the vitreous phase of said material and another part of the crystalline phase thereof are both formed by the reaction of potassium silico fluoride, sodium silico fluoride and alumina, comprising the steps of mixing from 6% to 42% potassium silico fluoride, 0% to 20% sodium silico fluoride, 6% to 42% alumina and 30% to 85% synthetic fluor-phlogopite mica together with a small amount of a temporary binder, compressing said mixture to form a preform, heating said preform to a temperature between 1500° F. and 1800° F. to cause the potassium silico fluoride, sodium silico fluoride and alumina to react to form a liquid, compressing said heated preform, and cooling said compressed preform whereby to cause said liquid to form a multiplicity of dispersed crystals forming the other part of the crystalline phase of said hot pressed material and a glass acting as a binder for said crystalline phase.

5. A method of making hot pressed material of the vitreo-crystalline type wherein synthetic fluor-phlogopite mica crystals form a part of the crystalline phase, and the vitreous phase of said material and another part of the crystalline phase thereof are both formed by the reaction of potassium silico fluoride, sodium silico fluoride, lithium silico fluoride and alumina, comprising the steps of mixing from about 30% to 85% synthetic fluorphlogopite mica, about 6% to 42% alumina, about 6% to 42% potassium silico fluoride, about 0% to 20% sodium silico fluoride and about 0% to 20% lithium silico fluoride together with a small amount of a temporary binder, compressing said mixture to form a preform, heating said preform to a temperature between 1500° F. and 1800° F. to cause the potassium silico fluoride, sodium silico fluoride, lithium silico fluoride and alumina to react to form a liquid, compressing said heated preform, and cooling said compressed preform whereby to cause said liquid to form a multiplicity of dispersed crystals forming the other part of the crystalline phase of said hot pressed material and a glass acting as a binder for said crystalline phase.

6. A method of making hot pressed material of the vitreo-crystalline type wherein micaceous crystals form a part of the crystalline phase, comprising the steps of mixing alumina, a plurality of alkali silico fluorides and micaceous material, heating said mixture to a temperature which causes the alkali silico fluorides and the alumina to react to form a liquid, compressing said heated mixture, and cooling said mixture whereby to cause said liquid to form a multiplicity of dispersed crystals forming another part of the crystalline phase of said hot pressed material and a glass acting as a binder for the crystalline phase.

7. The method of making a hot pressed ceramoplastic material, comprising the steps of mixing approximately 50% synthetic fluor-phlogopite mica, approximately 25% alumina, approximately 20% potassium silico fluoride and approximately 5% sodium silico fluoride, heating said mixture to a temperature between 1500° F. and 1800° F. to cause the potassium silico fluoride, sodium silico fluoride and alumina to react to form a liquid, pressing said heated mixture, and cooling said mixture whereby to cause said liquid to form a multiplicity of plate-like dispersed crystals and a glass to bind said synthetic fluor-phlogopite mica and said plate-like crystals.

8. A hot pressed material made in accordance with the method defined in claim 3.

References Cited in the file of this patent
UNITED STATES PATENTS

| | | |
|---|---|---|
| 2,136,877 | Delpech et al. | Nov. 15, 1938 |
| 2,400,337 | Buechner | May 14, 1946 |
| 2,405,011 | Buechner | July 30, 1946 |
| 2,516,983 | Hatch | Aug. 1, 1950 |
| 2,599,236 | Cramer et al. | June 3, 1952 |
| 2,669,764 | Kilpatrick | Feb. 23, 1954 |
| 2,829,061 | Comofero et al. | Apr. 1, 1958 |

FOREIGN PATENTS

| | | |
|---|---|---|
| 569,308 | Great Britain | May 17, 1945 |

OTHER REFERENCES

"Glass: The Miracle Maker," 2nd Edition, 1948 by C. J. Phillips, pp. 33 and 34.

"Synthetic Mica Research in Japan," by T. Noda, in Journal of the American Ceramic Society, vol. 38, #4, (1955) pp. 147–152.